(12) United States Patent
Strack et al.

(10) Patent No.: US 7,203,599 B1
(45) Date of Patent: Apr. 10, 2007

(54) METHOD FOR ACQUIRING TRANSIENT ELECTROMAGNETIC SURVEY DATA

(75) Inventors: Kurt M. Strack, Houston, TX (US); Leon A. Thomsen, Houston, TX (US); Horst Rueter, Dortmund (DE)

(73) Assignee: KJT Enterprises, Inc., Houston, TX (US)

( * ) Notice: Subject to any disclaimer, the term of this patent is extended or adjusted under 35 U.S.C. 154(b) by 0 days.

(21) Appl. No.: 11/343,125

(22) Filed: Jan. 30, 2006

(51) Int. Cl.
*G06F 19/00* (2006.01)

(52) U.S. Cl. ............... 702/2; 702/5; 702/16; 324/359; 324/354; 382/285; 340/286.14

(58) Field of Classification Search .............. 702/2, 702/5, 16; 324/359, 336, 354; 382/285; 340/286.14
See application file for complete search history.

(56) References Cited

U.S. PATENT DOCUMENTS

| | | | |
|---|---|---|---|
| 5,467,018 A | 11/1995 | Ruter et al. | |
| 5,563,513 A | 10/1996 | Tasci et al. | |
| 6,541,975 B2 | 4/2003 | Strack | |
| 6,603,313 B1 | 8/2003 | Srnka | |
| 6,628,119 B1 | 9/2003 | Eidesmo et al. | |
| 6,670,813 B2 | 12/2003 | Strack | |
| 6,739,165 B1 | 5/2004 | Strack | |
| 6,842,006 B2 | 1/2005 | Conti et al. | |
| 6,859,038 B2 | 2/2005 | Ellingsrud et al. | |
| 6,914,433 B2* | 7/2005 | Wright et al. ............... | 324/336 |
| 2005/0077902 A1 | 4/2005 | Macgregor et al. | |
| 2006/0186887 A1* | 8/2006 | Strack et al. ............... | 324/336 |

OTHER PUBLICATIONS

Hughes et al., 'Structure mapping at Trap Spring Oilfield Nevada, using controlled-source magnetotellurics', Nov. 1987, First Break Publication, vol. 5, No. 11, pp. 403-417.*
Gilbert et al., 'High Resolution electromagnetic imaging of the conductive Earth interior', 1994, IOP Publication, pp. 341-351.*
Cheesman et al., 'Porosity Determinations of Sediments in Knight Inlet Using a Transient Electromagnetic Systems', 1991, GML Publication, pp. 84-89.*

* cited by examiner

*Primary Examiner*—Marc S. Hoff
*Assistant Examiner*—Elias Desta
(74) *Attorney, Agent, or Firm*—Richard A. Fagin

(57) ABSTRACT

A method for controlled source electromagnetic Earth surveying includes deploying a plurality of electromagnetic sensors in a selected pattern at the top of an area of the Earth's subsurface to be surveyed. At least one of a transient electric field and a transient magnetic field is applied to the Earth in the vicinity of the sensors at a plurality of different positions. At least one of electric field amplitude and magnetic field amplitude at each of the sensors is recorded each time the transient electric field and/or magnetic field is applied. Each recording is adjusted for acquisition geometry. An image is generated corresponding to at least one sensor position using at least two stacked, adjusted recordings.

22 Claims, 5 Drawing Sheets

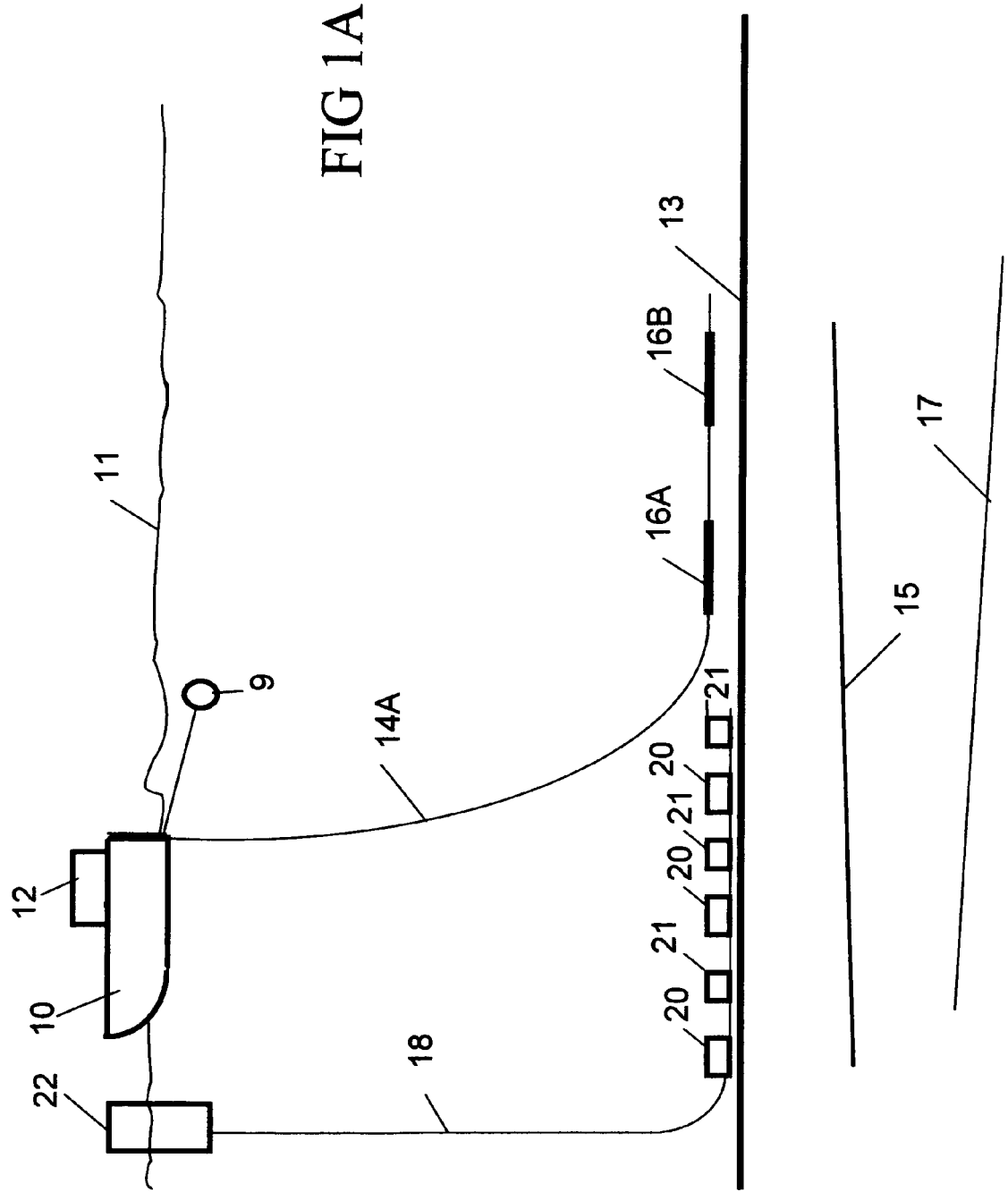

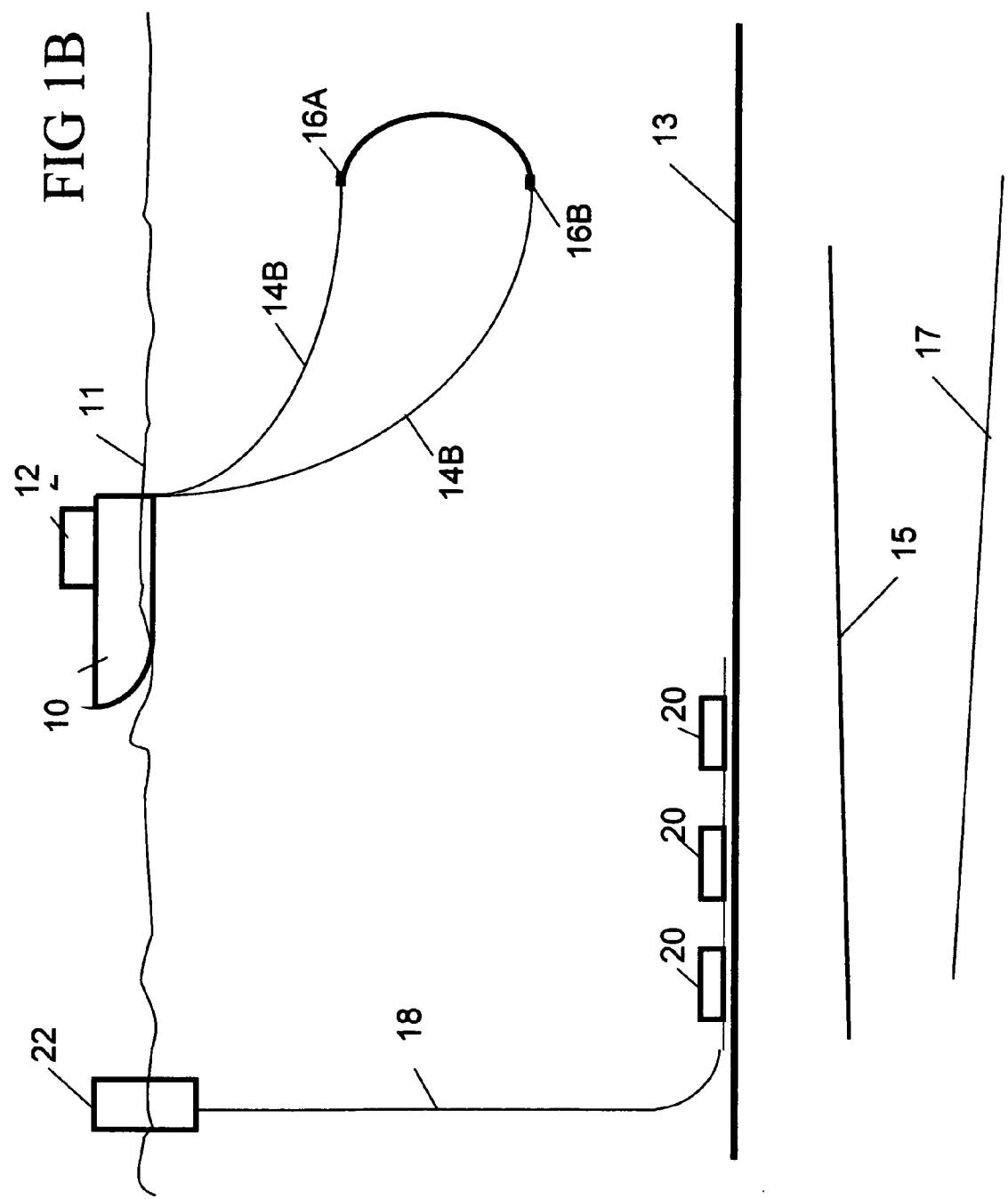

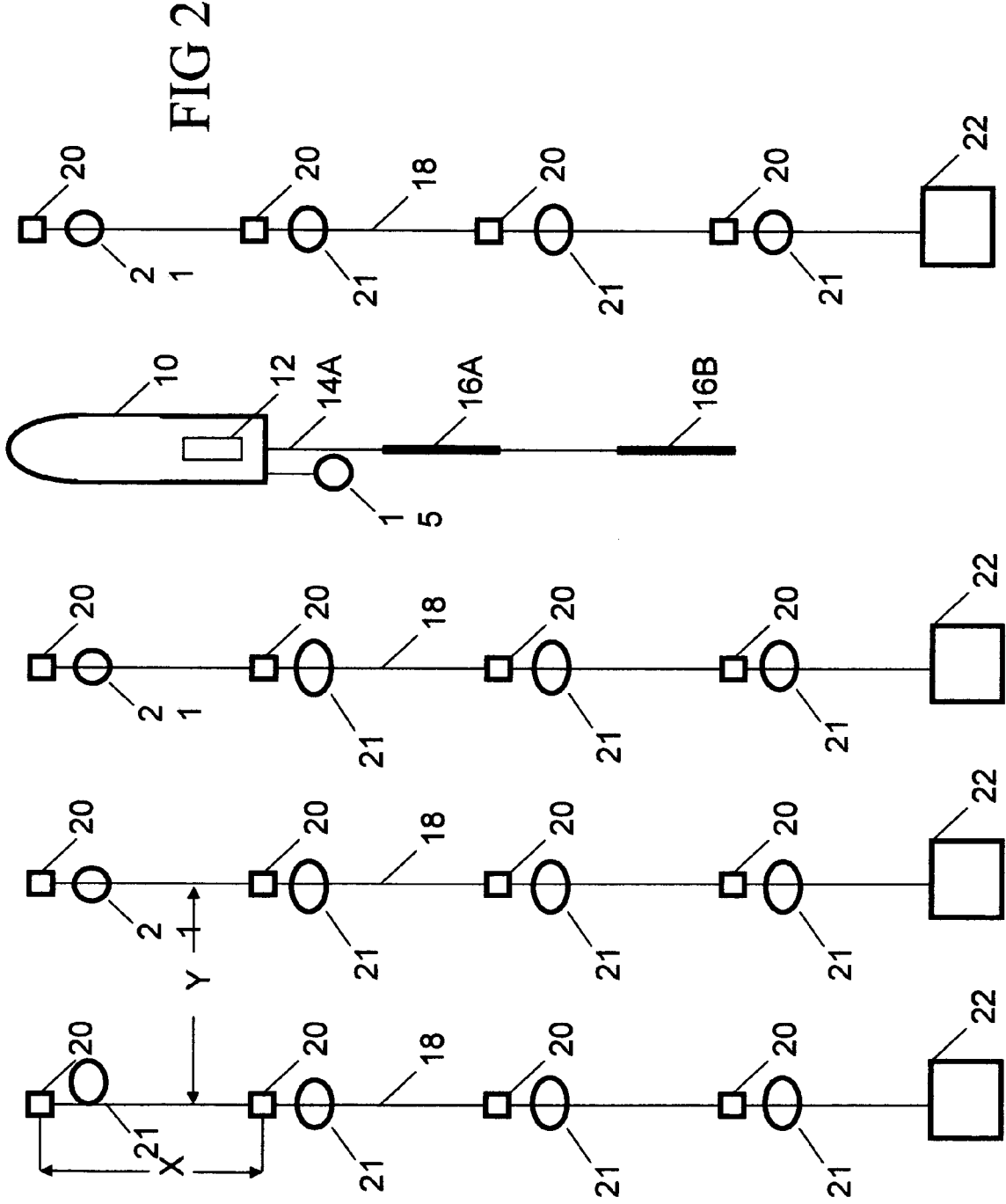

METHOD FOR ACQUIRING TRANSIENT ELECTROMAGNETIC SURVEY DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of controlled source electromagnetic surveying. More specifically, the invention relates to methods for acquiring transient electromagnetic surveys such that subsurface features may be more readily identified.

2. Background Art

Electromagnetic geophysical surveying includes "controlled source" electromagnetic surveying. Controlled source electromagnetic surveying includes imparting an electric field or a magnetic field into the Earth formations, those formations being below the sea floor in marine surveys, and measuring electric field amplitude and/or amplitude of magnetic fields by measuring voltages induced in electrodes, antennas and/or interrogating magnetometers disposed at the Earth's surface, or on or above the sea floor. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

Controlled source electromagnetic surveying known in the art includes imparting alternating electric current into formations below the sea floor. The alternating current has one or more selected frequencies. Such surveying is known as frequency domain controlled source electromagnetic (f-CSEM) surveying. f-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29–68. Other publications which describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153–160; Edwards, R. N., 1997, *On the resource evaluation of marine gas hydrate deposits using the sea-floor transient electric dipole—dipole method*: Geophysics, 62, No. 1, 63–74; Chave, A. D., Constable, S. C. and Edwards, R. N., 1991, *Electrical exploration methods for the seafloor*: Investigation in geophysics No 3, Electromagnetic methods in applied geophysics, vol. 2, application, part B, 931–966; and Cheesman, S. J., Edwards, R. N., and Chave, A. D., 1987, *On the theory of sea-floor conductivity mapping using transient electromagnetic systems*: Geophysics, 52, No. 2, 204–217.

Following are described several patent publications which describe various aspects of electromagnetic subsurface Earth surveying. U.S. Pat. No. 5,770,945 issued to Constable describes a magnetotelluric (MT) system for sea floor petroleum exploration. The disclosed system includes a first waterproof pressure case containing a processor, AC-coupled magnetic field post-amplifiers and electric field amplifiers, a second waterproof pressure case containing an acoustic navigation/release system, four silver—silver chloride electrodes mounted on booms and at least two magnetic induction coil sensors. These elements are mounted together on a plastic and aluminum frame along with flotation devices and an anchor for deployment to the sea floor. The acoustic navigation/release system serves to locate the measurement system by responding to acoustic "pings" generated by a ship-board unit, and receives a release command which initiates detachment from the anchor so that the buoyant package floats to the surface for recovery. The electrodes used to detect the electric field are configured as grounded dipole antennas. Booms by which the electrodes are mounted onto a frame are positioned in an X-shaped configuration to create two orthogonal dipoles. The two orthogonal dipoles are used to measure the complete vector electric field. The magnetic field sensors are multi-turn, Mu-metal core wire coils which detect magnetic fields within the frequency range typically used for land-based MT surveys. The magnetic field coils are encased in waterproof pressure cases and are connected to the logger package by high pressure waterproof cables. The logger unit includes amplifiers for amplifying the signals received from the various sensors, which signals are then provided to the processor which controls timing, logging, storing and power switching operations. Temporary and mass storage is provided within and/or peripherally to the processor. There is no active source in such MT methods, which rely upon naturally occurring EM fields.

U.S. Pat. No. 6,603,313 B1 issued to Srnka discloses a method for surface estimation of reservoir properties, in which average earth resistivities above, below, and horizontally adjacent to specifically located subsurface geologic formations are first determined or estimated using geological and geophysical data in the vicinity of the subsurface geologic formation. Then dimensions and probing frequency for an electromagnetic source are determined to substantially maximize transmitted vertical and horizontal electric currents at the subsurface geologic formation, using the location and the average earth resistivities. Next, the electromagnetic source is activated at or near the sea floor, approximately centered above the subsurface geologic formation and a plurality of components of electromagnetic response is measured with a receiver array. Geometrical and electrical parameter constraints are determined, using the geological and geophysical data. Finally, the electromagnetic response is processed using the geometrical and electrical parameter constraints to produce inverted vertical and horizontal resistivity depth images. Optionally, the inverted resistivity depth images may be combined with the geological and geophysical data to estimate the reservoir fluid and shaliness (fractional volume in the formation of clay-bearing rocks called "shale") properties.

U.S. Pat. No. 6,628,110 B1 issued to Eidesmo et al. discloses a method for determining the nature of a subterranean reservoir whose approximate geometry and location are known. The disclosed method includes: applying a time varying electromagnetic field to the strata containing the reservoir; detecting the electromagnetic wave field response; and analyzing the effects on the characteristics of the detected field that have been caused by the reservoir, thereby determining the content of the reservoir, based on the analysis.

U.S. Pat. No. 6,541,975 B2 issued to Strack discloses a system for generating an image of an Earth formation surrounding a borehole penetrating the formation. Resistivity of the formation is measured using a DC measurement, and conductivity and resistivity of the formations are measured with a time domain signal or AC measurement. Acoustic velocity of the formation is also measured. The DC resistivity measurement, the conductivity measurement made with a time domain electromagnetic signal, the resistivity measurement made with a time domain electromagnetic signal and the acoustic velocity measurements are combined to generate the image of the Earth formation.

International Patent Application Publication No. WO 0157555 A1 discloses a system for detecting a subterranean reservoir or determining the nature of a subterranean reservoir whose position and geometry is known from previous seismic surveys. An electromagnetic field is applied by a transmitter on the seabed and is detected by antennae also on the seabed. A refracted wave component is sought in the wave field response, to determine the nature of any reservoir present.

International Patent Application Publication No. WO 03048812 A1 discloses an electromagnetic survey method for surveying an area previously identified as potentially containing a subsea hydrocarbon reservoir. The method includes obtaining first and second survey data sets with an electromagnetic source aligned end-on and broadside relative to the same or different receivers. The invention also relates to planning a survey using this method, and to analysis of survey data taken in combination so as to allow the galvanic contribution to the signals collected at the receiver to be contrasted with the inductive effects, and the effects of signal attenuation (which are highly dependent on local properties of the rock formation, overlying water, and air at the survey area). This is very important to the success of using electromagnetic surveying for identifying hydrocarbon reserves and distinguishing them from other classes of subsurface formations.

U.S. Pat. No. 6,842,006 B1 issued to Conti et al. discloses a sea-floor electromagnetic measurement device for obtaining underwater magnetotelluric (MT) measurements of earth formations. The device includes a central structure with arms pivotally attached thereto. The pivoting arms enable easy deployment and storage of the device. Electrodes and magnetometers are attached to each arm for measuring electric and magnetic fields respectively, the magnetometers being distant from the central structure such that magnetic fields present therein are not sensed. A method for undertaking sea floor measurements includes measuring electric fields at a distance from the structure and measuring magnetic fields at the same location.

U.S. Patent Application Publication No. 2004/232917 relates to a method of mapping subsurface resistivity contrasts by making multichannel transient electromagnetic (MTEM) measurements on or near the Earth's surface using at least one source, receiving means for measuring the system response and at least one receiver for measuring the resultant earth response. All signals from each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored.

U.S. Pat. No. 5,467,018 issued to Rueter et al. discloses a bedrock exploration system. The system includes transients generated as sudden changes in a transmission stream, which are transmitted into the Earth's subsurface by a transmitter. The induced electric currents thus produced are measured by several receiver units. The measured values from the receiver units are passed to a central unit. The measured values obtained from the receiver units are digitized and stored at the measurement points, and the central unit is linked with the measurement points by a telemetry link. By means of the telemetry link, data from the data stores in the receiver units can be successively passed on to the central unit.

U.S. Pat. No. 5,563,913 issued to Tasci et al. discloses a method and apparatus used in providing resistivity measurement data of a sedimentary subsurface. The data are used for developing and mapping an enhanced anomalous resistivity pattern. The enhanced subsurface resistivity pattern is associated with and an aid for finding oil and/or gas traps at various depths down to a basement of the sedimentary subsurface. The apparatus is disposed on a ground surface and includes an electric generator connected to a transmitter with a length of wire with grounded electrodes. When large amplitude, long period, square waves of current are sent from a transmission site through the transmitter and wire, secondary eddy currents are induced in the subsurface. The eddy currents induce magnetic field changes in the subsurface which can be measured at the surface of the earth with a magnetometer or induction coil. The magnetic field changes are received and recorded as time varying voltages at each sounding site. Information on resistivity variations of the subsurface formations is deduced from the amplitude and shape of the measured magnetic field signals plotted as a function of time after applying appropriate mathematical equations. The sounding sites are arranged in a plot-like manner to ensure that aerial contour maps and cross sections of the resistivity variations of the subsurface formations can be prepared.

A limitation to f-CSEM techniques known in the art is that they are typically limited to relatively great water depth, on the order of 800–1,000 meters, or a ratio of ocean water depth to subsurface reservoir depth (reservoir depth measured from the sea floor) of greater than about 1.5 to 2.0.

A typical f-CSEM marine survey can be described as follows. A recording vessel includes cables which connect to electrodes disposed near the sea floor. An electric power source on the vessel charges the electrodes such that a selected magnitude of alternating current, of selected frequency or frequencies, flows through the sea floor and into the Earth formations below the sea floor. At a selected distance ("offset") from the source electrodes, receiver electrodes are disposed on the sea floor and are coupled to a voltage measuring circuit, which may be disposed on the vessel or a different vessel. The voltages imparted into the receiver electrodes are then analyzed to infer the structure and electrical properties of the Earth formations in the subsurface.

Another technique for electromagnetic surveying of subsurface Earth formations known in the art is transient controlled source electromagnetic surveying (t-CSEM). In t-CSEM, electric current is imparted into the Earth at the Earth's surface (or sea floor), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching strategies are possible; as will be explained in more detail below. Structure of the subsurface is inferred by the time distribution of the induced voltages and/or magnetic fields. t-CSEM techniques are described, for example, in Strack, K.-M., 1992, *Exploration with deep transient electromagnetics*, Elsevier, 373 pp. (reprinted 1999).

One limitation to f-CSEM techniques is that they require measuring the relatively weak EM signal from the secondary subsurface in the presence of a strong and continuing source signal. In t-CSEM techniques, the source is inactive during the time when the important subsurface signals are arriving at the receivers, so that the relatively weak subsurface signal may be more readily detected and analyzed.

SUMMARY OF THE INVENTION

One aspect of the invention is a method for controlled source electromagnetic Earth surveying. A method according to this aspect of the invention includes deploying a plurality of electromagnetic sensors in a selected pattern at the top of an area of the Earth's subsurface to be surveyed. At least one of a transient electric field and a transient magnetic field is applied to the Earth in the vicinity of the sensors at a plurality of different positions. At least one of electric field amplitude and magnetic field amplitude is recorded at each of the sensors each time the electric current and/or magnetic field is applied. Each recording is adjusted for acquisition geometry. An image is generated corresponding to at least one sensor position using at least two stacked, adjusted recordings.

Other aspects and advantages of the invention will be apparent from the following description and the appended claims.

BRIEF DESCRIPTION OF THE DRAWINGS

FIG. 1A shows a marine transient electromagnetic survey system using a horizontal electric dipole current source.

FIG. 1B shows a marine transient electromagnetic survey system using a vertical electric dipole current source.

FIG. 2 shows an array of t-CSEM sensors disposed in a plurality of ocean bottom cables for acquiring a survey according to the invention.

DETAILED DESCRIPTION

Figure 3:
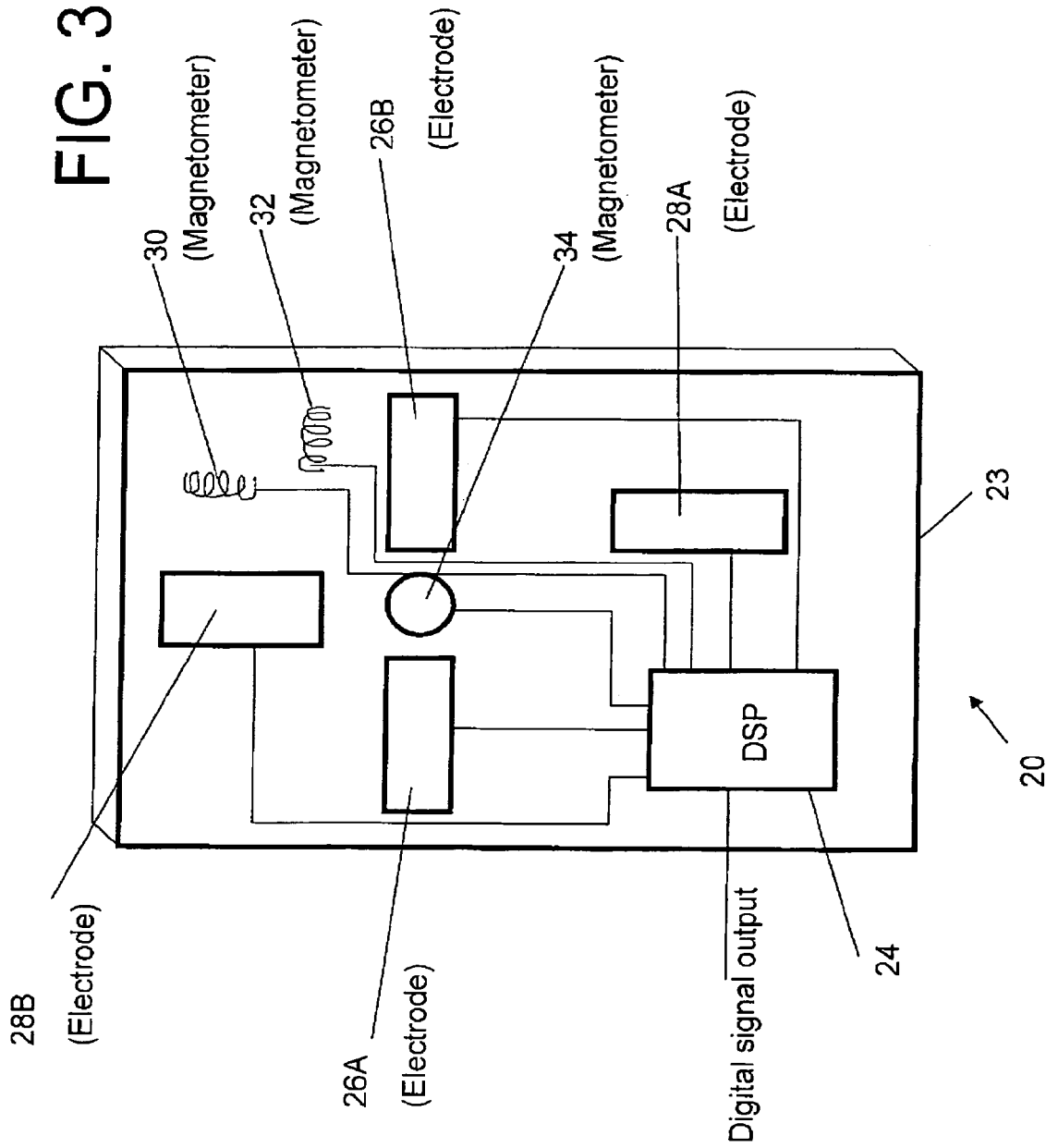
FIG. 3 shows one embodiment of an ocean bottom t-CSEM system sensor.

Aside from logistical details, the techniques discussed herein are equally applicable in marine or land surveys, although most of the description is made with reference to marine surveys. Accordingly, the invention is not limited in scope to use only with marine surveys.

FIG. 1A shows one embodiment of a marine transient controlled source electromagnetic (t-CSEM) survey system for use with methods according to various aspects of the invention. The system includes a survey vessel 10 that moves in a predetermined pattern along the surface of a body of water 11 such as a lake or the ocean. The vessel 10 includes thereon source actuation, signal recording and navigation equipment, shown generally at 12 and referred to herein as the "control/recording system." The control/recording system 12 includes a controllable source of electric current (not shown separately) used to energize electrodes 16A 16B towed in the water 11 near the bottom 13 thereof to impart an electric field in subsurface formations 15, 17 below the bottom 13 of the water 11. The control/recording system 12 typically includes instrumentation (not shown separately) to determine the geodetic position of the vessel 10 at any time, such as can be performed using global positioning system (GPS) receivers or the like. The control/recording system 12 in the present embodiment can include equipment to transfer signals from one or more recording buoys 22. The recording buoys 22 receive and store signals from each of a plurality of electromagnetic (EM) sensors 20 positioned at selected positions on the water bottom 13. The sensors 20 may be disposed along a cable 18. The cable 18 may be of a type ordinarily used in connection with seismic sensors deployed on the water bottom known in the art as "ocean bottom cables." The sensors 20 detect electric and/or magnetic fields that result from electric fields induced in the Earth's subsurface by current passing through the electrodes 16A, 16B. The sensors 20 will be explained in more detail below with reference to FIG. 3. The recording buoys 22 may include telemetry devices (not shown separately) to transmit data from the received signals to the vessel 10, and/or may store the signals locally for later interrogation by the control/recording system 12 or by another interrogation device. Alternatively, the sensors' signals may be locally and autonomously recorded, and such recordings may be retrieved at the end of the survey.

The current source (not shown separately) on the vessel 10 is coupled to the electrodes 16A, 16B by a cable 14A. The cable 14A is configured such that the electrodes 16A, 16B can be towed essentially horizontally near the water bottom 13 as shown in FIG. 1A. In the present embodiment, the electrodes can be spaced apart about 50 meters, and can be energized such that about 1000 Amperes of current flows through the electrodes 16A, 16B. This is an equivalent source moment to that generated in typical electromagnetic survey practice known in the art using a 100 meter long transmitter dipole, and using 500 Amperes current. In either case the source moment can be about $5 \times 10^4$ Ampere-meters. The electric current used to energize the transmitter electrodes 16A, 16B can be direct current (DC) switched off at a signal recording time index equal to zero. It should be understood, however, that switching DC off is only one implementation of electric current change that is operable to induce transient electromagnetic effects. In other embodiments, the electric current may be switched on, may be switched from one polarity to the other (bipolar switching), or may be switched in a pseudo-random binary sequence (PRBS) or any hybrid derivative of such switching sequences. See, for example, Duncan, P. M., Hwang, A., Edwards, R. N., Bailey, R. C., and Garland, G. D., 1980, *The development and applications of a wide band electromagnetic sounding system using pseudo-noise source*. Geophysics, 45, 1276–1296 for a description of PBRS switching.

In the present embodiment, as the current through the transmitter electrodes 16A, 16B is switched, a time-indexed recording of electric and/or magnetic fields detected by the various sensors 20 is recorded, either in the recording buoys 22 and/or in the control/recording system 12, depending on the particular configuration of recording and/or telemetry equipment in the recording buoys 22 and in the control/recording system 12.

FIG. 1B shows an alternative implementation of signal generation and recording, in which the transmitter electrodes 16A, 16B are arranged such that they are oriented substantially vertically along a cable 14B configured to cause the electrodes 16A, 16B to be oriented substantially vertically as shown in FIG. 1B. Energizing the electrodes 16A, 16B, detecting and recording signals is performed substantially as explained above with reference to FIG. 1A.

Referring once again to FIG. 1A, in some embodiments, the vessel 10 may also be used to tow a seismic energy source, shown generally at 9. The seismic energy source is typically an array of air guns, but can be any other type of seismic energy source known in the art. The control/recording system 12 in such embodiments includes control circuits (not shown separately) for actuating the seismic source 9 at selected times, and recording circuits (not shown separately) for recording signals produced by seismic sensors. In such embodiments, the ocean bottom cables 18 may also include seismic sensors 21. The seismic sensors 21 are preferably "four component" sensors, which as known in the art include three orthogonal geophones or similar motion or acceleration sensors collocated with a hydrophone or similar pressure responsive sensor. Four component ocean bottom cable seismic sensors are well known in the art. See, for example, U.S. Pat. No. 6,021,090 issued to Gaiser et al.

FIG. 2 shows a typical arrangement of ocean bottom cables 18 having EM sensors 20 at spaced-apart positions thereon for acquiring a three dimensional t-CSEM survey according to the invention. Each cable 18 may be positioned essentially along a line in a selected direction above a portion of the Earth's sub surface that is to be surveyed. The longitudinal distance between the EM sensors 20 on each cable is represented by x in FIG. 2, and in the present embodiment may be on the order of 100 to 200 meters. Each cable 18 is shown as terminated in a corresponding recording buoy 22, as explained above with reference to FIG. 1A. The cables 18 are preferably positioned substantially parallel to each other, and are separated by a lateral spacing shown by y. In the present embodiment, y is preferably substantially equal to x, and is on the order of about 100 to 500 meters. In some embodiments, the EM sensors 20 may be randomly distributed, that is, spacings x and y between adjacent sensors may be random. It is only necessary in such embodiments to know the geodetic position of each sensor, and that the average separation is as above. It is believed that random spacing may improve signal to noise ratio in the results of an electromagnetic survey.

For a two dimensional survey, only one such line of receivers is required, and the vessel 10 may pass only once along this line.

In conducting a survey, the vessel 10 moves along the surface of the water 11, and periodically the control/recording system 12 energizes the transmitter electrodes 16A, 16B as explained above. In some embodiments, the transmitter electrodes 16A, 16B are energized at selected times such that the vessel 10 moves about 10–100 meters between successive energizations of the transmitter electrodes 16A, 16B. Signals detected by the various EM sensors 20 are recorded with respect to time, and such time is indexed related to the time of energizing the electrodes 16A, 16B. By recording with such time indexing, inferences concerning the structure and composition of the Earth's subsurface may be made from the recordings. In the present embodiment, the vessel 10 is shown moving substantially parallel to the cables 18. In one embodiment, after the vessel 10 moves in a direction parallel to the cables 18, substantially above the position of each cable 18 on the water bottom 13, then the vessel 10 may move transversely to the cables 18, along sail lines substantially above the position of corresponding EM sensors 20 on each cable 18 on the water bottom 13. The reason for the parallel and transverse movement of the vessel 10 will be further explained below.

In some embodiments, a substantially contemporaneous seismic survey may be conducted by periodically actuating the seismic energy source 9, and recording the signals detected by the seismic sensors 21. Interpretation of the seismic signals may be performed using techniques known in the art.

In the present embodiment, therefore, a plurality of measurements are made at each EM sensor 20, each representing a unique geometry of the transmitter electrodes 16A, 16B with respect to each EM sensor 20. The plurality of measurements, each with a unique arrangement of transmitter-to-sensor geometry may be used in some embodiments to produce various forms of combined or "stacked" measurements, so as to improve the quality of images generated using t-CSEM measurements.

In the invention, the recordings of the signals from each of the EM sensors 20 may be corrected for the actual geometry of acquisition, such that effects of acquisition geometry may be corrected before any two or more recordings are "stacked" or summed. Those skilled in the art of seismic exploration will appreciate that such acquisition geometry correction is necessary in order to properly stack seismic recordings. Seismic recordings are commonly corrected prior to stacking by selecting seismic data recordings that represent acquisition of seismic signals having a "common mid point." Common mid point means that the location of the seismic energy source and the seismic receiver in any two recordings have the same mid point between them irrespective of the location of the source and receiver at each recording time. In the invention, signal recordings from the EM sensors (20 in FIG. 2) are selected for stacking such that the signal recordings also have a common mid point.

In seismic exploration, common mid point recordings are then processed by a procedure known as normal moveout correction. Normal moveout correction adjusts the timing of events in any seismic recording to that which would occur if the seismic energy source and the seismic receiver were collocated above the common mid point. The time correction thus adjusts event times in each recording to account for longer and longer energy travel paths for longer "offset" recordings. Such recordings are those made with longer and longer distances along the Earth's surface between the seismic energy source and the receiver.

As a generalized concept, correction for source-receiver offset in common mid point recordings can be applied to electromagnetic signal recordings. However, the correction is not necessarily made with respect to travel time. For example, one basis for correcting signal recordings for acquisition geometry is the signal amplitude. For a signal recording made using electric current amplitude represented by I, and an electrode spacing represented by $\Delta l$, the DC electric field strength E in the inline direction can be determined by the expression:

$$E(\rho) = \frac{I\Delta l}{\pi\sigma_0(1 + \sigma_1/\sigma_0)\rho^3} \quad (1)$$

in which $\sigma_1$ represents the electrical conductivity of the subsurface, $\sigma_0$ represents the electrical conductivity of the water, and $\rho$ represents the transmitter to receiver distance or offset (cf. Edwards, R. N., and Chave, A., 1986, *A transient electric dipole—dipole method for mapping the conductivity of the sea floor*: Geophysics 51, 984–987). The electric field amplitude in the transverse direction is calculated by a formula with similar offset dependence. Similar formulas can also be derived for magnetic field strength. As a result, the electric field at offset ρ may be corrected to that at $\rho_0$ (zero offset) the equation $$E(\rho_0) = E(\rho)\frac{\rho^3}{\rho_0^3} \quad (2)$$

After such correction. recordings acquired with different offsets may be stacked. In some embodiments, the stacking may be a form of stacking known as median stacking so as to further reduce transient noise effects in the stacked recording.

After stacked recordings are generated for a plurality of common mid points, each representing a different geodetic position in the Earth, an image of the Earth's subsurface may be generated using a plurality of stacked recordings. Generating the image may be performed using well known seismic image generating techniques. As a minimum, generating an image may include calculating at least one property of the electromagnetic measurements at a selected time using the stacked recordings. A property may include amplitude, phase or the like. The property may be used to determine a petrophysical property, or may be correlated to petrophysical properties determined from other measurements to determine a property of the Earth's subsurface at the common mid point.

FIG. 3 shows one embodiment of an EM sensor 20 in more detail. The EM sensor 20 may be enclosed in a housing 23 made from a dense, electrically non-conductive, non-magnetic material, such as high-density plastic, such that the EM sensor 20 will sink in the water and rest on the water bottom (13 in FIG. 1A). Electrodes 26A, 26B, 28A, 28B are positioned on the bottom of the housing 23 such that they contact the water bottom (13 in FIG. 1A). The electrodes are arranged in dipole pairs. One pair 26A, 26B can be oriented along the length of cable (18 in FIG. 2), and measures voltages along the direction of the cable. The other electrode pair 28A, 28B measures voltages induced transversely to the cable (18 in FIG. 2). The electrode pairs may span a distance of about 1 to 10 meters. The electrode pairs 26A, 26B and 28A, 28B may be coupled to a combined amplifier/digital signal processor 24 for converting the detected voltages into digital words corresponding to the voltage amplitude at selected moments in time. The present embodiment of the sensor 20 may include one or more magnetometers 30, 32, 34 oriented along mutually orthogonal directions. In the present embodiment, two of the magnetometers 30, 32 may be oriented such that their sensitive axes are oriented along the same direction as the dipole moment of a corresponding electrode pair 26A, 26B and 28A, 28B. The signal output of each magnetometer 30, 32 34 may be coupled to the digital signal processor 24. The digitized signal output of the signal processor 24 can be coupled to the recording buoy (22 in FIG. 2) for transmission to the control/recording system (12 in FIG. 1A) or later interrogation by the control/recording system (12 in FIG. 1A).

Figure 4:
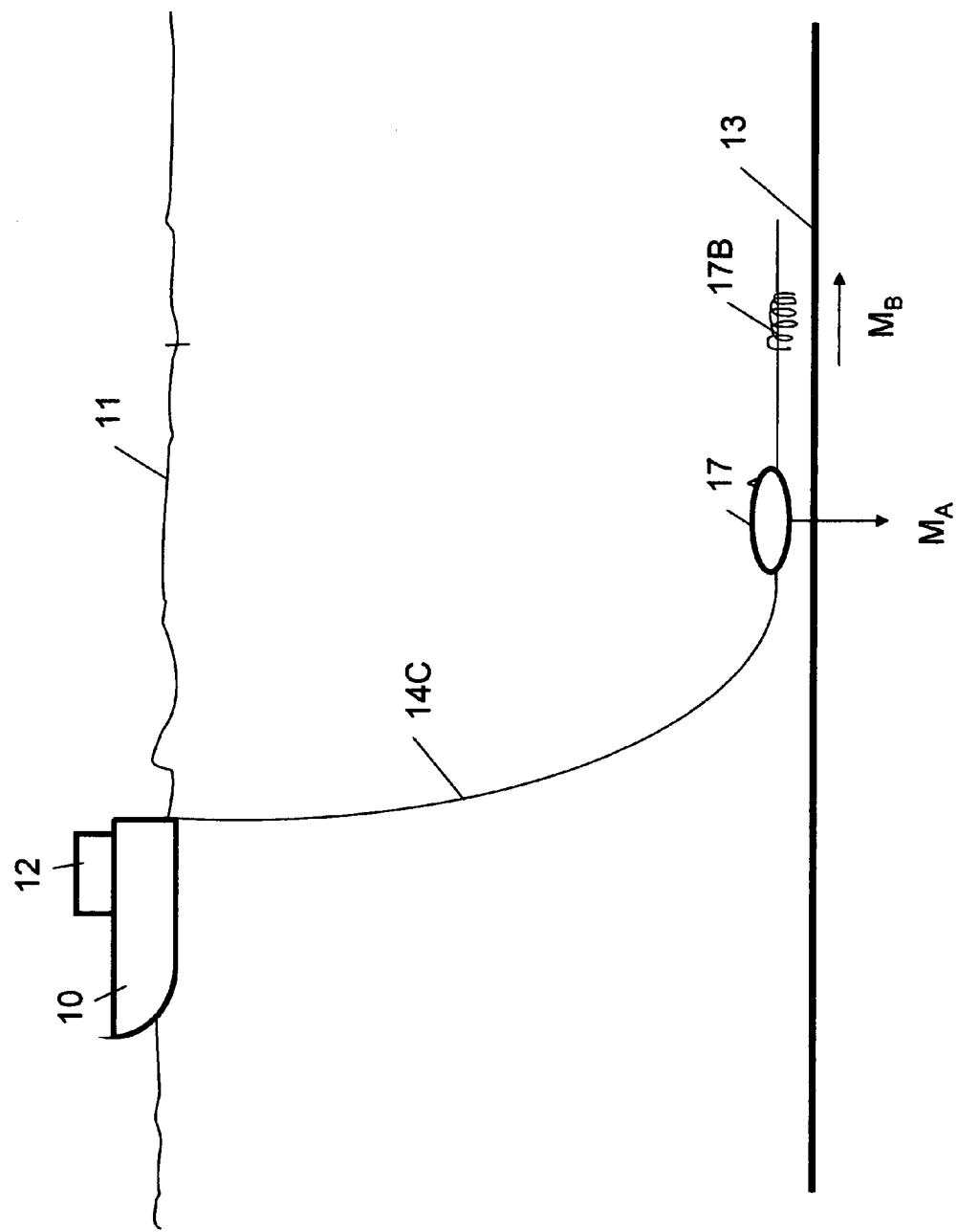
FIG. 4 shows an alternative way to energize the Earth using magnetic fields.

The embodiment of a system shown in FIG. 1A and FIG. 1B uses electric current applied to electrodes to impart an electric field into the Earth's subsurface. An alternative to imparting electric fields is to impart magnetic fields, and such will be explained with reference to FIG. 4. In FIG. 4, the vessel 10 tows a cable 14C which is connected to two loop transmitters 17A and 17B. The first loop transmitter 17A encloses an area perpendicular to the water bottom 13. Periodically, the control/recording system 12 causes electric current to flow through the first loop transmitter 17A. The current can be in any of the same forms as described with reference to FIG. 1A, including switched DC, PBRS, and alternating polarity DC. When the current changes, a transient magnetic field having dipole moment along direction $M_A$ is imparted into the Earth. At the same or at different times, current is applied to the second loop transmitter 17B. The second loop transmitter may be in the form of a solenoid or coil, having a magnetic moment along direction $M_B$. Surveying using the magnetic field loop transmitters 17A, 17B may be performed substantially according to the survey pattern explained above with reference to FIG. 2.

The embodiments explained above with reference to FIG. 4, and the embodiments explained previously with reference to FIGS. 1A and 1B show magnetic and/or electric dipoles along orthogonal directions. In some embodiments, orthogonal dipole antennas and/or current loops may be used to induce rotating electric and/or magnetic fields in the Earth's subsurface. Methods for generating rotating electric and/or magnetic fields are known in the art and include applying selected fractional amounts of the total electric current to the orthogonal antennas and/or current loops.

The foregoing embodiments have been explained in the context of marine electromagnetic surveying. It should be clearly understood that the foregoing embodiments are equally applicable to surveys conducted on land at the surface of the Earth. When conducted on land at the surface of the Earth, the sensors can be deployed in substantially similar patterns to that shown in FIG. 1. The survey current source may be applied in the form of electric current, as shown in FIG. 1A, at the Earth's surface, or in the form of magnetic fields, as shown in and described with reference to FIG. 4. For purposes of defining the scope of the invention, the various survey devices can be said to be disposed at the top of an area of the Earth's subsurface to be surveyed. The top of the Earth's subsurface will be at the bottom of the water in a marine survey, and at the surface of the Earth in a land based survey, or on the top of a layer of floating ice where such surveys are to be conducted.

Those skilled in the art will appreciate that the various embodiments described herein which include a moving electromagnetic energy source and stationary receivers are functionally equivalent to corresponding embodiments wherein the electromagnetic energy sources are stationary, such as being positioned on the water bottom in a pattern similar to those shown in the Figures where the EM sensors 20 are located, and electromagnetic sensors are moved through the water. Accordingly, in the appended claims, references to positions of electromagnetic sources and receivers are intended to include such corresponding source and receiver locations within their scope. The functional equivalence is a result of the principle of reciprocity, known to those skilled in the art.

Embodiments of a method according to the invention may provide electromagnetic survey data having resolution similar to that of three-dimensional seismic data known in the art, and having sufficient signal to noise ratio to enable mapping of spatial distribution of resistivity of the Earth's subsurface to correspond to seismic mapping of the Earth's subsurface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlled source electromagnetic wave Earth surveying, comprising:
   deploying a plurality of electromagnetic sensors in a predetermined pattern above a portion of the Earth's subsurface to be surveyed;
   applying at least one of an electric field and a magnetic field to the Earth in the vicinity of the sensors at a plurality of different positions, the electric field produced by passing an electrical current transient through electrodes, the magnetic field produced by passing an electrical current transient through an antenna;
   recording at least one of electric field amplitude and magnetic field amplitude at each of the sensors each time the at least one of the electric field and the magnetic field is applied to the Earth;
   adjusting each recording for acquisition geometry; and
   generating an image corresponding to at least one sensor position using at least two stacked, adjusted recordings.

2. The method of claim 1 wherein the electric power transient is generated by switching direct current.

3. The method of claim 2 wherein the switching comprises turning the direct current off.

4. The method of claim 2 wherein the switching comprises turning the direct current on.

5. The method of claim 2 wherein the switching comprises reversing the direct current polarity.

6. The method of claim 2 wherein the switching comprises changing the direct current polarity in a pseudo random binary sequence.

7. The method of claim 1 wherein electric field amplitudes are detected along two orthogonal directions.

8. The method of claim 1 wherein magnetic field amplitudes are detected along three mutually orthogonal directions.

9. The method of claim 1 wherein the sensors are deployed in a regular grid pattern having a spacing between sensors of about 100 to 500 meters.

10. The method of claim 1 wherein the applying comprises applying along a direction parallel to a direction of deployment of the sensors.

11. The method of claim 1 wherein the applying comprises applying along a direction perpendicular to a direction of deployment of the sensors.

12. The method of claim 1 wherein the applying comprises applying along a selected direction oblique to a direction of deployment of the sensors, or along a sequence of selected oblique directions.

13. The method of claim 1 wherein the stacked image is derived from a set of recordings with a common mid point.

14. The method of claim 1 wherein the stacked recording comprises a median stack.

15. The method of claim 1 wherein the applying the at least one of electric field and magnetic fields is performed at intervals of the order of ten meters or more.

16. The method of claim 1 wherein the electric current is applied to a dipole electrode in a substantially horizontal direction.

17. The method of claim 1 wherein the electric current is applied to a dipole electrode in a substantially vertical direction.

18. The method of claim 1 wherein the magnetic field is oriented substantially vertically.

19. The method of claim 1 wherein the magnetic field is oriented substantially horizontally.

20. The method of claim 1 wherein a top of the Earth's subsurface is near a bottom of a body of water.

21. The method of claim 1 further comprising
   deploying a plurality of seismic sensors in a selected pattern at the top of the area of the Earth's subsurface;
   actuating a seismic energy source proximate the top of the area substantially contemporaneously with the recording at least one of the electric and magnetic field amplitudes; and
   recording signals generated by the seismic sensors in response to the actuation of the seismic energy source.

22. The method of claim 1 wherein the applying at least one of an electric field and a magnetic field to the Earth in the vicinity of the sensors comprises applying at least one of a rotating electric field and a rotating magnetic field.

* * * * *